United States Patent [19]

Bush, Jr. et al.

[11] 3,908,495
[45] Sept. 30, 1975

[54] LOG PROCESSING MACHINE

[76] Inventors: Thomas P. Bush, Jr., 133 Red Oak Rd., Birmingham, Ala. 35206; Samuel Edward Grant, 7254 Sandy Bluff Dr., Jacksonville, Fla. 32211

[22] Filed: Jan. 14, 1974

[21] Appl. No.: 432,872

Related U.S. Application Data

[62] Division of Ser. No. 177,257, Sept. 2, 1971.

[52] U.S. Cl. .................. 83/112; 83/155; 83/411 R; 83/733
[51] Int. Cl. ...................... B27b 5/02; B27b 25/00
[58] Field of Search ......... 83/84, 91, 109, 112, 149, 83/155, 155.1, 165, 166, 409.1, 409 R, 411 R, 733

[56] References Cited
UNITED STATES PATENTS

| | | | |
|---|---|---|---|
| 619,541 | 2/1899 | Butterfield | 83/409.1 |
| 1,933,531 | 10/1933 | Miller | 83/411 R |
| 2,393,617 | 1/1946 | De Spain | 83/411 R X |
| 2,554,989 | 5/1951 | Johnson et al. | 83/733 X |
| 2,810,438 | 10/1957 | Stone | 83/411 R |

*Primary Examiner*—Donald R. Schran
*Attorney, Agent, or Firm*—Newton, Hopkins & Ormsby

[57] ABSTRACT

This invention relates to a log handling system for use in processing logs to be used in the paper pulp industry and in saw mill operations. More particularly, this invention includes a series of operable cutting means for cutting a log into a plurality of predetermined lengths. A log feeding means is operatively associated with the log cutting means for moving a log past the cutting means to effect the cutting operations. The log feeding means includes a ramp portion detailed for feeding logs by gravity to the log feeding means. The ramp portion includes a selectively movable section detailed for movement between a ramp log feeding position and an elevated position which will allow a log to be dropped onto a first conveying means for conveying selected logs away from the plurality of cutting means. The first conveyor means includes an operative stop means for stopping the selected logs at a predetermined location along the conveying route. A single operable cutting means is operatively associated with the first conveying means and located at a predetermined location away from the operative stop means and operable for cutting a log located on the first conveying means into a predetermined length for use in a saw mill operation. A pair of log ejecting means are operatively associated with the first conveying means for ejecting a log therefrom in selected opposite transverse directions. A second conveying means is supported on the system at a position below and adjacent the feeding means and has a plurality of cutting means for conveying the plurality of cut lengths of log away from the log handling system. Also, operatively associated with the plurality of cutting means is a collecting ramp for collecting the sawdust created in the cutting operation. The collecting ramp includes a third conveying means for conveying the collected sawdust away from the log handling system. The second conveying means used for moving the plurality of cut logs includes an adjustable end portion selectively movable in a vertical plane for depositing the length of cut logs on a collecting trolley at a plurality of vertically spaced positions.

14 Claims, 10 Drawing Figures

LOG PROCESSING MACHINE

This is a division of application Ser. No. 177,257, filed Sept. 2, 1971.

BACKGROUND OF THE INVENTION

In the past, logs to be used by the pulp industry were normally cut to lengths in the woods by workmen performing the logging operation. This method of operation of handling logs required a great amount of manual labor to mark the logs to length and then cut the same. After the logs were cut to the predetermined lengths, they were then loaded by hand on the support vehicle, normally a specially designed truck for use in delivering the logs to a collection point, whereby the logs were then placed on a railroad boxcar for transport to the pulp industry. All of the above described steps normally used in the handling of logs for use in the pulp industry created an excessive amount of manual labor. Since manual labor is not now readily available and the cost of manual labor has increased tremendously, other means and methods of handling logs for use in the pulp industry have become necessary.

In developing the machinery for use in the automatic or more advanced log handling system, it has become more practical to merely cut a tree in the woods, remove the limbs and top therefrom, and transport the complete length of the tree to an automatic log cutting system.

There have been several attempts to provide austomatic log handling systems which will reduce the amount of the manual labor required. However, most of the prior attempts to produce automatic log handling machines have been extremely complex in nature, expensive to manufacture and unreliable in operation.

In the processing of logs which have been cut in the forest and transported to a log handling system, it is desirous to utilize certain sizes or diameters of logs for use in one type of industry such as the pulp industry, and to utilize a larger log having a greater diameter for use in a saw mill industry in the manufacture of lumber. It is always possible to use manual labor to remove the selected logs for use in one industry from the logs that were to be used in another industry. However, again the use of manual labor has become impractical for performing these operations. There have been some attempts made to provide log selecting means whereby a single operator with automatic controls could select and move certain predetermined sized logs to one location for accumulation and processing as required and to remove a second size to a second location for processing as required. However, most of the prior art machinery which was utilized in attempting to segregate predetermined sized logs were impractical to manufacture and to operate.

In advancing a log past a series of cutting members to cut a log into a plurality of predetermined lengths, the problem of moving the log past the cutters to prevent a binding of the log with a cutter mechanism is difficult and will sometimes cause a jamming of the logs with the cutters, thus stopping the operation thereof.

In utilizing automatic cutting means for cutting logs into lengths, the handling of sawdust created thereby often becomes a problem and must be considered in the design of automatic log handling machinery.

OBJECTS OF THE INVENTION

It is, therefore, a primary object of this invention to provide a log handling system for use in cutting of log into a plurality of predetermined lengths.

Another object of this invention is to provide a log handling system having a log feeding means for automtically feeding a log past a series of operable cutting means.

A further object of this invention is to provide a controlled selecting means for segregating logs according to size.

A still further object of this invention is to provide a log handling system having conveying means for receiving a series of logs cut to predetermined lengths and for conveying the logs to a collecting means.

Another object of this invention is to provide a conveying means for a log handling system capable of delivering conveyed logs to a plurality of vertically spaced locations.

Still another object of this invention is to provide a log handling system including a plurality of cutting means with collecting means for collecting and conveying the sawdust to a remote location.

A further object of this invention is to provide a log handling system which is capable of conveying a selected log along a first path, stopping the log at a predetermined location, cutting the log into a predetermined length and then transferring the cut log transversely along a second predetermined path.

Still another object of this invention is to provide a cyclically operable feeding means for feeding a log selectively along a first predetermined path.

Another object of this invention is to provide a rotary log feeding means capable of individually moving a selected log along a path through and beyond a plurality of cutting means.

A still further object of this invention is to provide an improved method of processing logs to be used in the pulp industry and in saw mill operations.

An additional object of this invention is to provide a log handling system which is simple in construction, economical to manufacture and reliable in operation.

These and other objects and advantages of the details of construction will become apparent after reading the accompanying specification with reference to the attached drawings wherein like reference characters have been used to refer to like parts throughout the several figures of drawings and wherein:

DESCRIPTION OF THE ILLUSTRATIVE EMBODIMENTS

Contents

A — General Description
B — Log Feeding Means
C — Log Cutting Means
D — Cut Log Handling Means
E — Sawdust Collecting Means
F — First Modification
G — Second Modification
H — Operation

GENERAL DESCRIPTION

Figure 2:
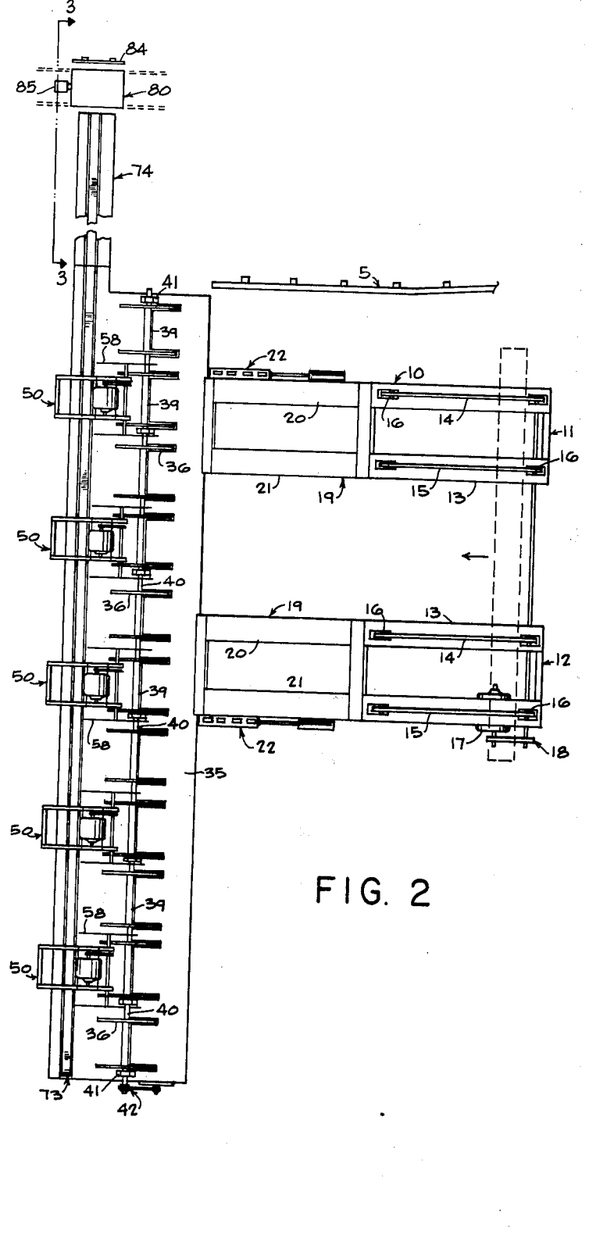
FIG. 2 is a top plan view of one embodiment of the log handling system similar in construction to the one shown in FIG. 1 with certain parts being added thereto and certain parts being omitted therefrom for purposes of clarity.
Figure 4:
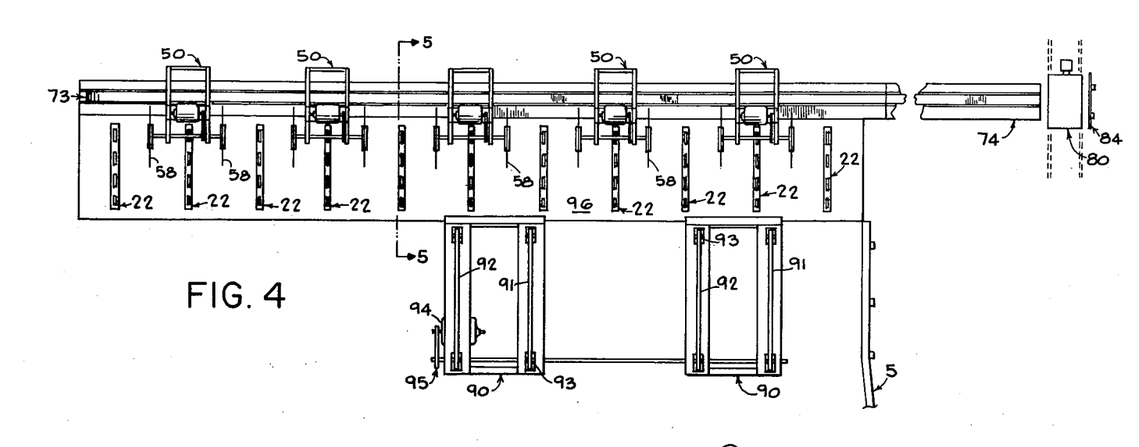
FIG. 4 is a fragmentary top plan view of a modification of the log handling system with certain portions of the log handling assembly being omitted for purposes of clarity.
Figures 6, 8:
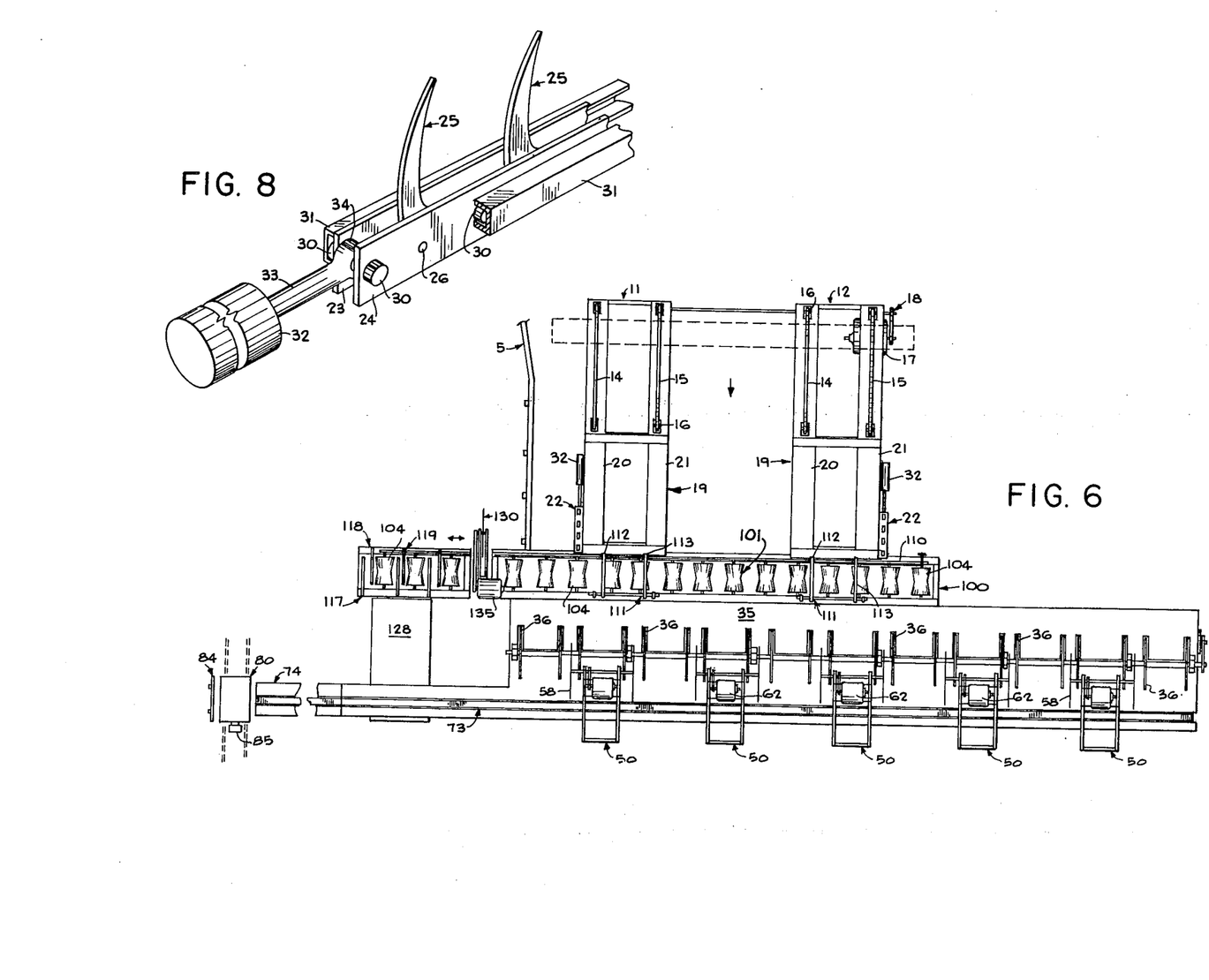
FIG. 6 is a fragmentary top plan view of a further modification of a log processing system with certain portions being omitted for purposes of clarity.
FIG. 8 is an enlarged fragmentary perspective view of the log indexing means with certain portions broken away and certain portions shown in section for purposes of clarity.

The log handling system of the present invention includes a log feeding means 10 having infeed tables 11 and 12, log indexing means 22 and rotary log feeding 36 means for feeding logs in a first predetermined direction along a path substantially transverse to the longitudinal axis of the logs. The logs are placed in position on the log feeding means 10 by a conventional fork lift truck or placed directly thereon from an off-loading transport vehicle. A log aligning guide means 5 is operatively associated with the log feeding means 10 substantially as shown in FIGS. 2, 4, and 6 for contacting one end portion of the logs to guide the logs to a correct aligned position on the log handling system. The log handling system includes series of cutting discs detailed in spaced relationship relative to each other and in spaced relationship relative to the log aligning guide means 5 such that the logs will be cut into substantially equal predetermined lengths. After the logs have been cut into the predetermined lengths, they are deposited on a conveying means which moves the logs in a second direction along a path substantially parallel to the longitudinal axis of the cut lengths of logs. The conveying means is detailed for conveying the cut lengths of logs into a prearranged pattern for transportation away from the log handling system for further processing.

A sawdust collection means 70 is operatively associated with the cutting assemblies 50 for collecting and conveying the sawdust away from the log handling system.

Figure 1:
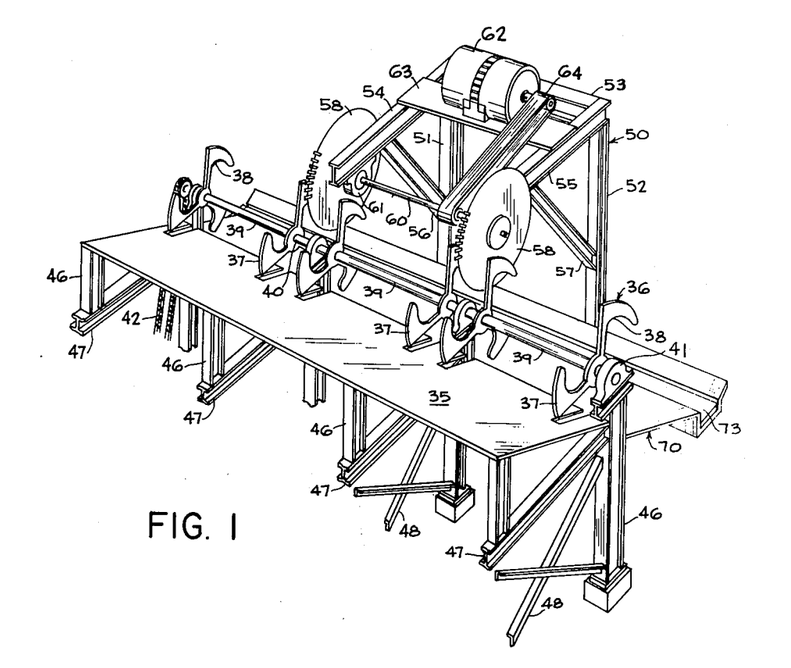
FIG. 1 is a fragmentary perspective view of one embodiment of the log handling system showing the rotary log feeding means and cutting assembly associated therewith.
Figure 3:
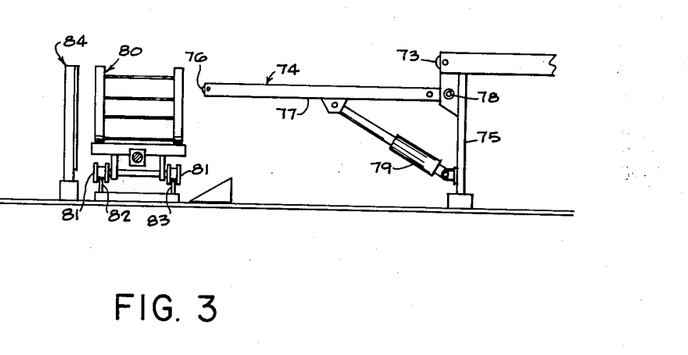
FIG. 3 is a fragmentary elevational view taken in the direction of the arrows 3—3 as shown in FIG. 2.
Figure 5:
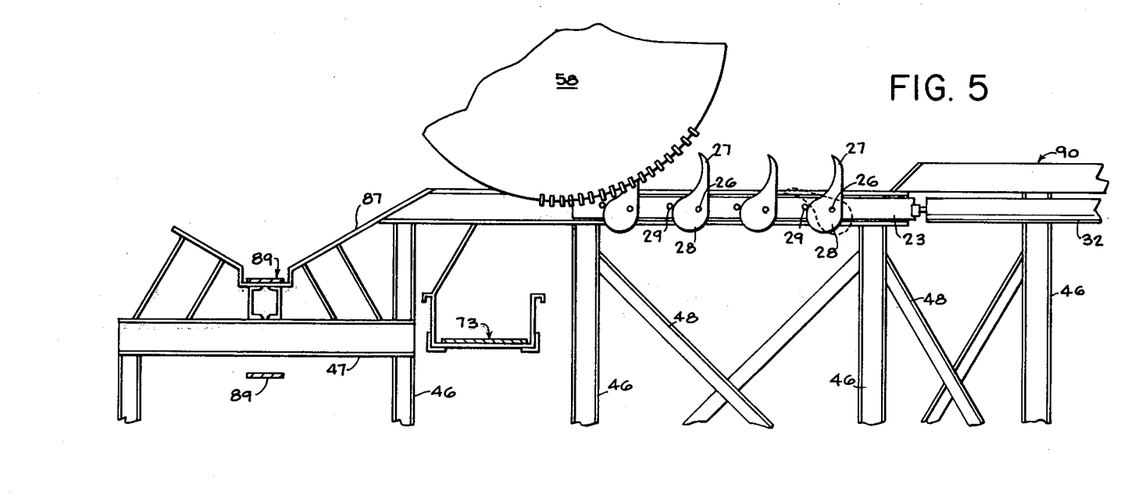
FIG. 5 is a fragmentary vertical sectional view taken substantially along the lines 5—5 of FIG. 4.

A modified form of the log handling system is shown in FIGS. 4 and 5 and is substantially identical to the log handling system shown in FIG. 1-3 with the exception that the rotary feeding means 36 has been eliminated and a series of reciprocably operable log indexing means 22 substituted therefor.

A second modification of the log handling system is shown in FIGS. 6, 7, 9, and 10. The second modification of the log handling system is substantially identical to the system illustrated in FIGS. 1-3 with the exception that a means is operatively associated therewith for segregating logs according to their size and shape, whereby first segregated ones of the logs can be advanced along a path substantially parallel to the longitudinal axis of the logs for a further cutting operation. Second segregated ones of the logs are allowed to continue advancing along the first predetermined direction for feeding movement into the plurality of rotary cutting means 50 to cut the second segregated ones of the logs into equal predetermined lengths. The cut logs are then advanced in a second direction along a path substantially parallel to the longitudinal axis to the cut lengths of logs for accumulation in a predetermined pattern on a trolley vehicle means. A detailed description of the mechanisms for accomplishing the above described feeding, conveying, and cutting operations will be described herein below.

LOG FEEDING MEANS

The function of the log feeding means 10 is to provide a conveying means for moving or advancing logs from a remote location to a position to be cut into a plurality of predetermined lengths. Logs are placed on the feeding means by conventional means such as a forklift truck or could be unloaded directly thereon from a transport vehicle.

As shown in FIGS. 1 and 2, the feeding means 10 includes a pair of infeed tables 11 and 12 which are supported in space relationship relative to each other to provide a support for advancing of logs to the rotary cutter means. Each of the pair of infeed tables 11 and 12 includes a first portion 13 having a pair of endless chains 14 and 15 rotatably supported thereon by conventional sprockets 16. The endless chains 14 and 15 are driven by a motor 17 through a conventional chain and sprocket drive means 18. The endless chains 14 and 15 are detailed in supporting relationship relative to the infeed tables 11 and 12 such that the upper run of the endless chains 14 and 15 will provide a support for a log placed thereon and will advance the log from top to bottom as shown in FIG. 2. Each of the infeed tables 11 and 12 also includes a second protion 19 which has a pair of log support runners 20 and 21 provided thereon. The runners 20 and 21 are spaced slightly below the first portion 13 of the infeed tables 11 and 12, whereby the logs which are advanced from the first portion of the infeed tables can be easily moved on to the second portion of the infeed tables 11 and 12. As shown in FIG. 2, each of the infeed tables 11 and 12 includes a log indexing feed means 22 located on the outer edge of each of the infeed tables second portion 19 and adjacent on opposite end from the receiving end of the first infeed portion 13.

Referring now particularly to FIG. 8, each of the log indexing means 22 includes a pair of generally vertically oriented plate members 23 and 24. Pivotally supported between the plate members 23 and 24 are a plurality of indexing lugs 25. The lugs 25 are pivoted to the plate members at 26 and include a vertically extending log engaging portion 27 and a depending enlarged abutment portion 28. Supported on the plate members 23 and 24 adjacent a forward end of each of the abutment portions 28 as shown in FIG. 5 is a stop member 29 which will limit the clockwise rotation of the lug members 25 about the pivot 28 to a position as shown in FIG. 4 wherein the vertically extending log engaging portion is supported in a substantially vertical position. The above described pivotal arrangement of the log indexing lugs 25 will permit the lugs 25 to rotate counterclockwise as shown in FIG. 5 to a retracted inoperative position substantially as shown in dotted lines in FIG. 5 to allow the indexing plates 23 and 24 and log indexing lugs 25 to be moved to the right to pass under a series of logs held in position thereabove. The log indexing feed means 22 is supported for reciprocating movement by a plurality of laterally projecting rollers 30 which are rotatably supported on plates 23 and 24 by conventional means (not shown). The rollers 30 are rotatably supported by a pair of channel shaped runners 31 which support the indexing feed means 22 in a correct aligned position along the outer edges of the infeed table second portion 19.

Reciprocating movement of the log indexing means 22 is provided by a conventional power control cylinder means 32 which includes a conventional piston rod 33 connected at 32 to the pair of plate members 23 and 24.

Figure 7:
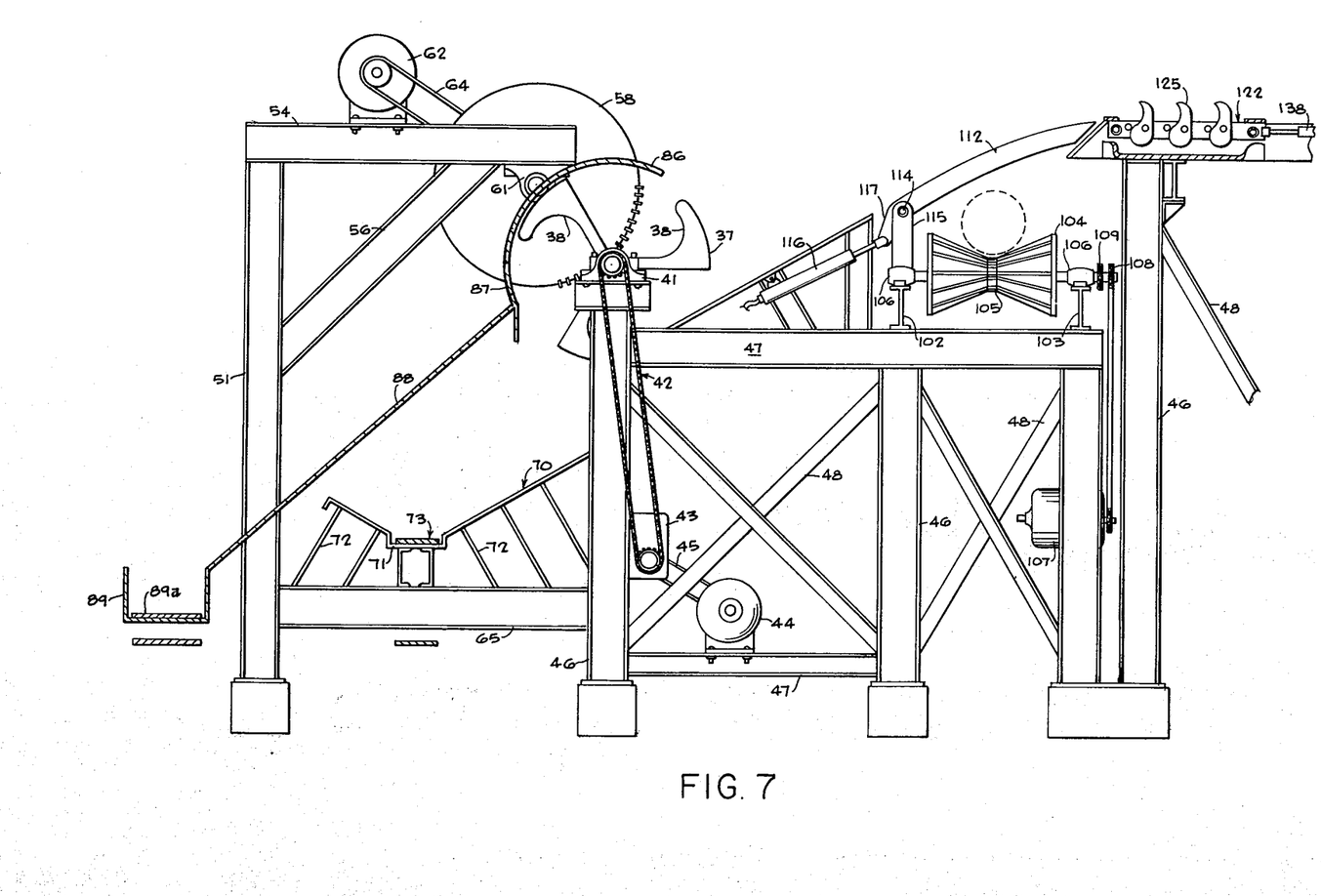
FIG. 7 is an enlarged vertical sectional view taken substantially along lines 7—7 of FIG. 6.

As shown in FIG. 2, a downwardly inclined ramp means 35 is located immediately adjacent the dispensing end of the pair of infeed tables 11, 12. The ramp means 35 is inclined downwardly as shown in FIG. 1 and terminates adjacent a plurality of rotary log feed means 36. Each of the rotary log feed means includes a plurality of radially projecting arms 37. Each of the radially projecting arms 37 are detailed to include a log cavity portion 38 for receiving and supporting a log therein. As shown in FIG. 1, two of the rotary feed means 36 are located between spaced cutter means and are fixed to a sleeve 39 which is keyed by conventional means (not shown) to a support shaft 40. The support shaft 40 is supported in a substantially horizontal relationship by means of conventional bearing means 41. Rotary drive is provided to the rotary feed means by a conventional chain and sprocket drive means 42 which is connected to a conventional gear box 43 (as shown in FIG. 7). Drive to the gear box is provided by a conventional motor means 44 through a conventional pulley drive means 45.

The above described log feeding system is supported in proper spaced relationship above a supporting surface by a plurality of vertically and horizontally oriented support members 46, 47 respectively which are shown in FIG. 1 to be of substantially "I" beam type construction. The support system also includes a plurality of angle brace members 48 connected between certain of the vertically extending support members 46 to help maintain the support framework in a substantially rigid supporting condition. It is to be understood that the vertically extended members 46, horizontally extended members 47 and angle brace members 48 are connected to each other by conventional means such as welding (not shown). Also, the above described pair of endless chain members 14 and 15, including pulley support means 16, are supported on the support framework by conventional bearing means (not shown).

LOG CUTTING MEANS

Referring now particularly to FIGS. 1 and 2, the log processing system includes a log cutting means for cutting a log into a plurality of predetermined lengths. As shown in FIG. 2, the log cutting means includes a plurality of cutting assemblies 50 supported on the log handling system in predetermined spaced relationship. Each of the log cutting assemblies includes a pair of vertically extending members 51 and 52 connected together adjacent their top edge by a cross connecting bar 53. A pair of support arms 54 and 55 project forwardly from the vertically extending support members 51 and 52 and brace means 56 and 57 are connected in angled relationship between the vertical support members 51 and 52 and the forwarding projecting support arms 54 and 55. A pair of rotary cutting discs 58 are supported on the forwardly projecting ends of the support arms 54 and 55 by means of a shaft 60 journaled in bearing means 61. The pair of rotary cutting discs 58 are driven by a motor 62 mounted on a support plate 63 extending between the pair of arms 54 and 55. Drive from the motor 62 is delivered to the shaft 60 by means of a conventional belt and pulley drive arrangement 64.

The rotary cutting discs 58 are supported in detailed laterally spaced relationship with respect to the rotary feed means 36 whereby one of the rotary cutting discs 58 will be supported between adjacent rotary feeding means, as shown in FIG. 1. Also, the rotary cutting discs 58 are supported in vertically spaced relationship relative to the rotary feeding means 36 wherein the rotary axis of the cutting discs 58 is supported above the rotary axis of the rotary feed means 36. The diameters of the rotary feed means 36 and rotary cutting means are detailed such that the outer cutting surfaces, of the rotary dutting discs 58 are spaced slightly above the axis of the rotary feed means. The cutting assemblies 50 are supported in spaced relationship relative to the rotary feed 36 means by means of a horizontally extending beam 65 which extends between the vertically extending support members 51 and 52 and vertically extending members 46 of the log feeding means, as shown in FIG. 7.

CUT LOG HANDLING MEANS

After the logs have been cut into a plurality of predetermined lengths by the rotary cutting discs 58, it is necessary to convey the cut logs away from the system and to collect the logs into a prearranged pattern for transportation to further log processing means.

As shown in FIG. 7, the cut log handling means includes a substantially V-shaped collecting trough 70 having a flat bottom portion 71. The V-shaped trough and flat bottom portion 70 and 71, respectively are supported by a series of vertically extending support members 72 which are connected to the connecting beams 65 and vertically extending member 46 of the log processing system support framework. An endless conveyer 73 is supported on the log collecting means such that the upper run of the conveyer will rest in the flat bottom portion of the collecting trough. The endless conveyer 73 is is supported by conventional pulley means (not shown) and is driven by conventional motor means (not shown) to convey the cut logs to the left, as shown in FIG. 2 and thus to deliver the logs away from the log processing system. The endless conveyer 73 includes an extended end 74 which is supported by vertical support means 75 as shown in FIG. 3.

Referring now particularly to FIG. 3, the extended end 74 of the cut log conveying means includes a second endless conveyor 76 which is supported by a frame means 77 pivoted at 78 on the vertically extending support framework 75. The second endless conveyor 76 and supporting frame 77 are supported for movement in a vertical plane whereby the extended end of the second converyer 76 can be moved to selected vertically spaced locations. Movement of the extended end of the second conveyer 76 is accomplished by a conventional power control cylinder 79 which is connected by conventional means between the second conveyer frame means 77 and the vertically extending framework 75.

As the logs are conveyed off the extended end of the second conveyor means 76, the logs are deposited on a log trolley means or trolley type support vehicle 80 used for transporting the logs away from the above described log processing system, whereby the logs can be further processed by additional means as necessary. The trolley support vehicle 80 is supported by conventional wheel means 81 on a pair of laterally spaced track means 82 and 83. As shown in FIG. 3, a log stop and aligning means 84 is provided adjacent the trolley support vehicle. The log stop and aligning means 84 is detailed to provide a stop which will limit the extent of movement of the logs over the support vehicle 80 and will insure correct alignment of the logs on the support vehicle 80. The log stop means 84 is detailed in vertical and horizaontal dimensions to be substantially equal to the dimensions of the log supporting vehicle 80. As shown in FIG. 2, a conventional power control cylinder means 85 is provided on the log processing system adjacent the log trolley means 80 for advancing the log trolley means 80 transversely relative to the extended end of the second conveyer member 76 whereby the logs can be placed at various transverse spaced positions on the log supporting trolley 80. The operational relationship of the cut log conveying means and the log supporting trolley 80 will be described in more detail herein below in the description of the operation of the log processing system.

SAWDUST COLLECTING MEANS

The function of the sawdust collecting means is to collect the residue of wood (sawdust) which is created in the cutting operation of the series of cutting assemblies. Since the amount of sawdust created in subsequent cutting operations is of a sufficient amount that some means is necessary for conveying or moving the sawdust away from the log processing system in order to keep the area around the log processing system substantially free from any obstructing means which would prevent operation thereof.

Referring now particularly to FIG. 7, the sawdust collecting means includes an arcuate shaped hood means 86 which is supported by conventional means (not shown) adjacent each of the cutting assemblies. The arcuate shaped hood 86 is supported in detailed relationship relative to the rotary feeding means whereby the radially extending arms 38 of the rotary feeding means will be allowed to pass underneath the arcuate shaped hood means substantially as shown in FIG. 7. The hood means 86 includes and enlarged open area 87 which will permit the sawdust created by a sawing operation to pass therethrough onto a downwardly inclined ramp means 88. The ramp means 88 terminates adjacent a lower end into a substantially rectangular shaped trough means 89. The rectangular trough means 89 is provided with a conventional endless type conveying means 89a which has an upper run supported adjacent the bottom of the trough means 89 for receiving and carrying sawdust away from the log processing system.

It is to be understood that the endless conveying means 89a is of conventional construction and is supported by conventional pulley control means and driven by conventional power control means (not shown).

FIRST MODIFICATION

The modification of the log handling system described herein below is substantially the same as the first embodiment described above, with the exception that the rotary log feeding means 36 has been eliminated. Referring now particularly to FIGS. 4 and 5, the modified log handling system includes a series of rotary cutting assemblies 50 which are identical to the above described rotary assemblies and reference is made to the above description of the rotary cutting members 50 for the details of construction. In the modification shown in FIGS. 4 and 5, the rotary log feeding means 36, including the radially projecting arms 37, have been omitted and a separate feeding means has been provided therefor. As shown in FIG. 4, the modified log feeding means includes a pair of infeed tables 90 supported relative to each other in laterally spaced relationship and are supported by a series of vertically extending members 46, horizontal members 47, and angle brace members 48, as described above in the first embodiment of the log handling system. Each of the infeed tables includes a pair of endless chain members 91, 92 which are rotatably supported by conventional sprocket means 93. Drive to the endless chain members 91, 92 is provided by a conventional motor 94 through a conventional chain and sprocket drive arrangement 95. The endless chain means 91, 92 are supported on the infeed tables whereby the upper run of the endless chain will be spaced slightly above the infeed tables to convey a log placed thereon from right to left as shown in FIG. 5. A substantially flat table portion 96 is provided immediately adjacent the infeed end of the pair of infeed tables 90. The flat table portion 96 is dimensioned substantially equal in length to the plurality of cutting assemblies. Supported on the table portion 96 is a series of log indexing or feeding means 22 which are reciprocally operable to advance a log from a position adjacent the infeed end of the endless conveyors to a position past the rotary cutting assemblies 50. The series of log indexing means 22 are identical in design to the log indexing means 22 described above in the first embodiment, and reference is made to the above description of the reciprocally indexing means 22 for details of construction. The modification of the log handling system herein described includes a cut log collecting means 97 having an endless conveyor 98 which is of conventional construction and substantially identical to the cut log collecting means described above in regard to the first embodiment. The modified log handling system of FIGS. 4 and 5 also includes a sawdust collecting means 99 similar in construction to the sawdust collecting means described above in regard to the first embodiment. Attention is invited to the above described first embodiment for the details of construction of the various component parts which are of similar construction. In the modification of FIGS. 4 and 5, it is to be understood that the cut logs are conveyed away from the log handling system and are deposited on a vehicle trolley collecting means substantially as described above in the first embodiment.

SECOND MODIFICATION

In the processing of logs which have been cut in the forest and transported to a location for processing, certain of the logs are desirable for use in a saw mill operation in the production of lumber and certain other of the logs are more useful for use in pulp industry. For this reason it is desirable to provide a system of segregating the logs according to their size and shape. The second modification of the log handling system as will be described herein below provides a means for segregating selected logs according to their size and shape as indicated above.

Referring now particularly to FIGS. 6, 7, 9 and 10, the second modification of the log handling system includes a log feeding system 10 having a pair of infeed tables 11, 12, endless chain conveying means 13, 14 and log indexing means 22 as described herein above in the first embodiment. Reference is made to the descriptions of the infeed tables 11, 12 in the first embodiment for the details of construction. The second modification also includes a series of cutting assemblies 50, a rotary log feeding means 36, and downwardly inclined ramp means 35, all of which are identical to the corresponding structure described above in the first embodiment. The modification herein described also includes a cut log conveying means 73 for conveying the cut logs to a trolley vehicle and a sawdust collection and conveying means 86, as shown in FIGS. 6, 7, 9, and 10.

Referring now particularly to FIGS. 6 and 7, the second modification as herein described includes a log segregating system 100 for separating and conveying selected logs which are desirable for use in the manufacture of lumber away from the cutting assemblies 50. The log segregating system includes a conveyor means 101 consisting of a series of rollers 104 rotatably supported by conventional bearing means 106 on a pair of spaced parallel transverse I beams 102, 103. Each of the rollers 104 is detailed in design to include a substantially convex shaped surface portion 105 for maintaining logs on the conveyor and for conveying the logs to the left as shown in FIG. 6. The conveyor means 101 including rollers 104 is driven by a conventional motor means 107 through a conventional chain and sprocket drive means 108 which is connected to the right most roller 104, as shown in FIG. 6. The shaft which supports the right most roller as shown in FIG. 6 also includes a second sprocket 109 having mounted thereon a second chain drive means 110 operatively connected to drive each of the other series of conveying rollers 104 by conventional means (not shown). The above described conveying means 101 is located on the log processing system between the pair of infeed tables 11, 12 and the ramp feed means 35 and supported on the framework at a distance vertically spaced below the infeed end of the tables 11, 12 and below the upper edge of the inclined ramp means 35. The above described relationship of the infeed tables will permit a log to be conveyed from the end of the infeed tables by the indexing log feed means 22 onto the transversely extending conveyor means 101.

Supported above the transverse log feeding conveyor 101 is a pair of movable ramp section 111. Each of the movable ramp sections 111 includes a pair of projecting arm portions 112, 113 which are fixed to a shaft 114. Shaft 114 is journaled for rotation on the transverse I beam 102 by means of mounting brackets 115. The movable ramp sections 111 are provided with power controlled cylinder means 116 which are connected to the supporting framwork at one end by conventional means (not shown) and are connected to a downwardly depending arm 117 fixed to the shafts 114. The two movable ramp sections including two extending arms 112, 113 and power controlled cylinder means 116 are detailed in relationship relative to each other whereby the movable ramp sections can be held in a ramp feeding position substantially as shown in FIG. 7 whereby logs which are conveyed or indexed by the log indexing means 22 will slide by gravity over the movable ramp sections 111 onto the inclined ramp table 35. Operation of the power control cylinder 116 is detailed for effecting movement of the movable ramp sections 111 to a point where the arms 112, 113 are rotated counterclockwise about the axis of shaft 114 to provide a space between the end of the infeed tables and the extended end of the arms 112, 113 whereby selected logs can be dropped into the transverse conveying means 101, as desired.

Figure 9:
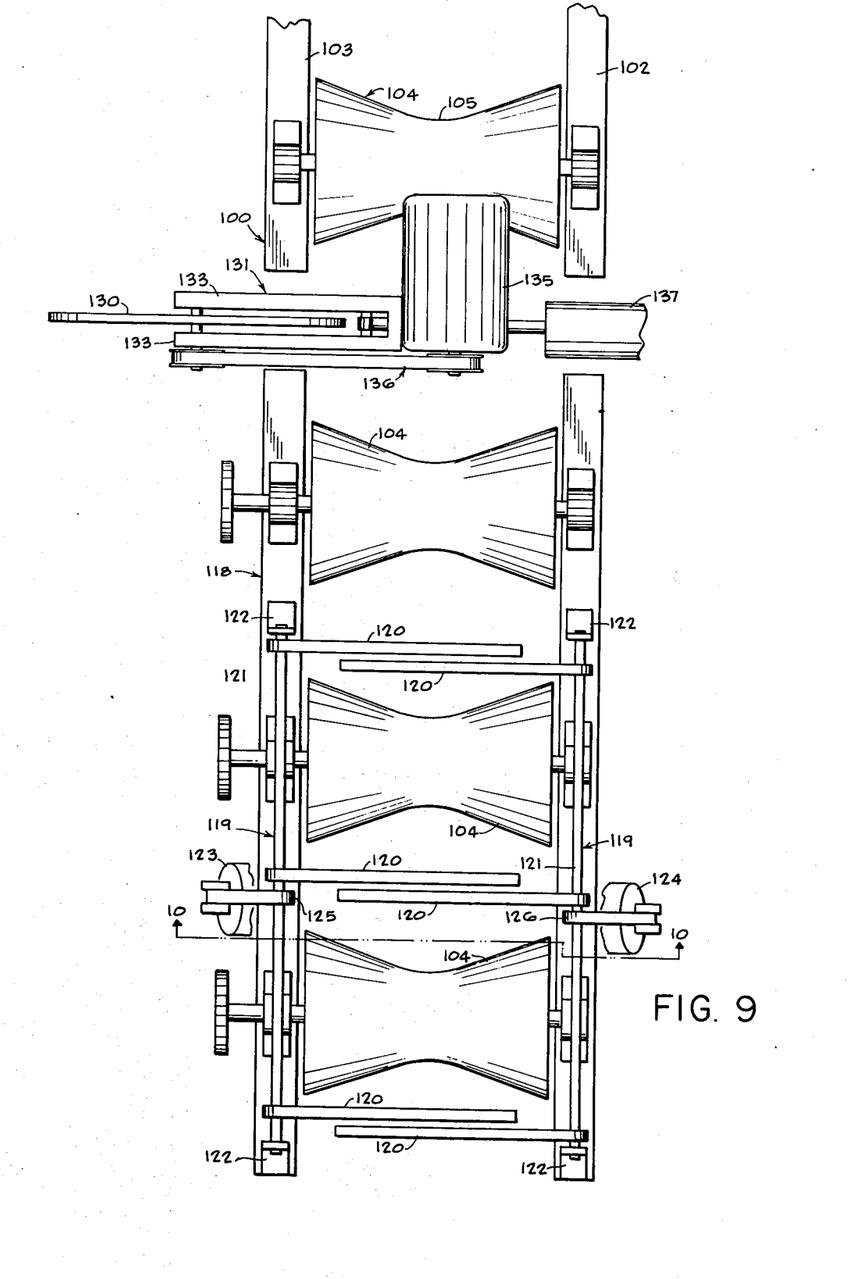
FIG. 9 is a fragmentary top plan view of a portion of the conveying means shown in FIG. 6 drawn on an enlarged scale.
Figure 10:
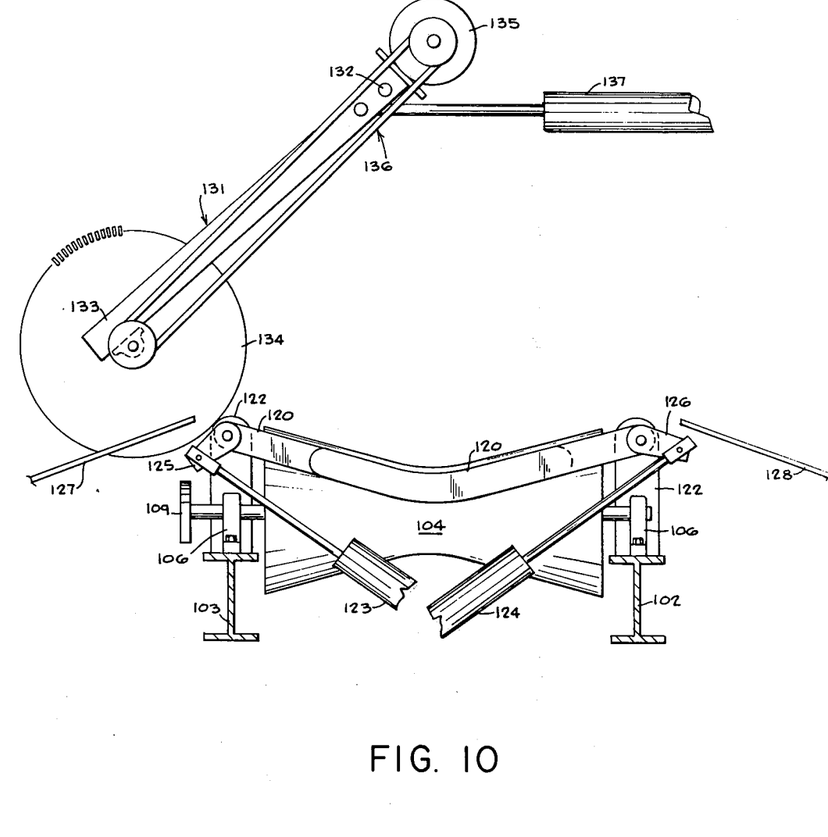
FIG. 10 is an enlarged vertical sectional view taken substantially along lines 10—10 of FIG. 9, with certain parts being omitted for purposes of clarity.

Referring now particularly to FIGS. 6 and 9, the transverse conveyor means 101 includes a second portion 118 which is supported in a longitudinally spaced relationship relative to the first conveyor section 101. The second conveyor section 118 includes a series of roller means 104 which are supported and controlled substantially the same as the roller means 104 of the first conveyer section 101. As shown in FIGS. 9 and 10, the second conveyor section 118 is provided with a pair of log ejecting means 119 which are detailed in design and operation for ejecting a log from the second conveyor section 118 in opposite transverse direction. Each of the pair of log ejecting means 119 includes a series of arms 120 fixed to a transverse shaft 121. The shaft 121 is rotatably supported by brackets 122 fixed to the conveyor transverse I beams. Each of the series of projecting arms 120 are detailed in configuration to have a substantially convex shaped end portion conforming substantially to the convex shape of the roller means 104, as shown in FIG. 10. Each of the pair of log ejecting means 119 is provided with a power controlled cylinder means 123, 124, respectively for operating the log ejecting means from a retracted non-operating position substantially as shown in FIG. 10 to an operable position whereby the arms 120 are moved to a substantially vertically aligned position to lift a log held in position on the second conveyor section and ejecting the same in a selected transverse direction. The power control cylinders 123, 124 are pivotally connected at one end by conventional means to the frame supporting means (not shown) and are pivotally connected adjacent their opposite end to downwardly extending arms 125, 126, respectively, fixed to the shafts 121. As shown in FIG. 10, a pair of ramp means 127, 128 are provided on opposite lateral sides of the second conveyor section 118 for receiving a log ejected by the log ejecting means 119 and conveying the same by gravity away from the second conveyor section 118. Referring now particularly to FIG. 6, the ramp means 128 is detailed such that a log being conveyed thereon by gravity will move onto the cut log conveyor means 73 for further conveyance of an ejected log to the trolley car supporting vehicle. Logs which are ejected onto the ramp 128 are conveyed to a collecting source (not shown)

whereby the logs can be transported to a saw mill operation for the manufacture of conventional lumber.

Referring now particularly to FIGS. 6 and 10, a log cut-off means 130 is provided between the conveyor section 101 and conveyor section 118 for cutting a log held in position thereon. The saw cut-off means 130 includes a support bracket 131 pivotally supported on a transverse supporting shaft 132, supported on framework (not shown) and includes a pair of downwardly projecting arm portions 133 located on opposite sides of a conventional rotary cutting disc 134. The cutting disc 134 is journaled on arm 133 by conventional bearing means (not shown). Operable drive means are provided to the rotary cutting disc 134 by means of a motor 135 supported on an upwardly extending end of the mounting bracket 131. Drive from the motor 135 is delivered by a conventional belt and pulley drive means 136 to the cutting disc 134. The above described mounting bracket 131 with cutting disc 134 is detailed for an oscillating movement about the pivotal support shaft 132. Oscillating movement of the cutting disc 134 about shaft 132 is provided by a conventional power control cylinder 137 connected adjacent one end by conventional means (not shown) to a support framework and is connected adjacent an opposite end to the mounting bracket 131. The operational characteristics of the related mechanism of the log processing system described in the second modification will be described in more detail hereinbelow in the operation of the log processing system.

OPERATION

Referring now particularly to FIGS. 1–3, to begin an operation of the log processing system, a manual control switch will be energized to provide electrical current to the motor means 62 which operates the series of cutting assemblies 50. It is to be understood that the motor means 62 is provided with conventional circuitry means and conventional manual control switch for initiating operation thereof. After operation of the cutting assemblies 50 has been initiated, a second manual control switch will be energized to effect operation of the endless chain conveyor means 14, 15 supported on the pair of infeed tables 11, 12. A still third manual control switch will be operated to provide a reciprocating motion to the log indexing means 22. It is to be understood that the log indexing means 22 is operated by conventional means, such as a power controlled hydraulic cylinder which would receive a supply of hydraulic fluid under pressure from a conventional hydraulic pump provided with conventional operable valve means for effecting a reciprocating operation of the indexing means 22. Before a log processing operation could begin it would now be necessary to energize a switch to effect operation of the plurality of rotary feed means 36 by providing power to the motor means 44. It is to be understood that it would be possible to provide a single manual control switch means which would effect operation of all the motor drive means to the various components above described substantially simultaneously. Since the circuitry which would be used to provide power means to the above described motor means would be of conventional design, the details of the circuitry have been omitted herefrom.

After all of the above described motor means have been initiated to effect operation of the infeed table conveyor means 114, 115, the log indexing means 122, the rotary log feeding means 36, the series of cutting assemblies 50, and the conveyor means 73, 89 for conveying the cut logs and sawdust away from the log processing operation, a log processing operation is ready to begin by placing a log on the outer end of the infeed tables as shown in FIG. 2. The logs can be placed on the infeed tables by conventional fork lift truck means or could be placed thereon directly from an off-loading truck vehicle. After a log has been placed on the infeed table conveyor chain means 114, 115, the log will be conveyed there along until it drops onto the second portion 19 of the pair of infeed tables 11, 12. As a series of the logs are accumulated on the second portion 19 of the infeed table, the logs will be forced there along by the conveyor chains 114, 115 until they contact the log indexing means 22. The reciprocal operation of the log indexing means 22 will provide a cycle of operation including two directions of movement wherein in response to one direction of movement of the log indexing means 22 with the series of log indexing lugs 25 will move to a retracted non-operable position wherein the lugs 25 are held in a substantially horizontal position permitting them to pass underneath the surface of logs contained on the second portion 19 of the infeed tables. At the end of the first stroke of reciprocal movement and during the first portion of the second direction of reciprocal movement, the indexing lugs 25 will be pivoted to a substantially vertically extending position, due to the weight of the enlarged abutment portion 28 and due to the lug vertical extending end 27 engaging a log held in position there above. The series of indexing lugs will continue to rotate clockwise about their pivotal axis 26 until the enlarged abutment portion 28 contacts the lug stop means 29 and at this position the indexing lugs will advance a log to the left, as shown in FIG. 7, until the log has been moved to a point sufficient to slide by gravity down the inclined ramp means 35 to the rotatable feeding means 36. The above described log indexing means will insure a cycle of log feeding operation whereby logs are fed one at a time from the log feeding tables onto the ramp means 35 for further movement by the rotary feeding means 36.

After a log has been deposited on the inclined ramp means 35, the log will move by gravity downwardly until the logs contact or engage one of the log cavity portions 38 defined by the radially extending arms 37. It is to be understood that the radially extending arms 37 of all of the rotary feed means are angularly supported relative to each other to provide for substantially axial alignment of the log cavity portions 38. After a log has moved into position in one of the log cavity portions 38, the log will be lifted vertically upward into contact with the cutting surface of the series of rotary cutting disc 58. A continued rotation of the rotary feeding means 36 would advance the log through the cutting operation whereby the logs would be completely severed, deposited onto the V-shaped collecting trough means 70, permitting the endless conveyor 73 to convey the logs transversely of the log processing operation. As the logs are moved laterally along the endless conveyor, they will be deposited on the second cut-log conveyor portion 76, as shown in FIG. 3. The second conveyor portion 76 can be adjusted in a vertical plane about the pivot axis 78 by the power control cylinder 79 whereby logs can be deposited on a trolley vehicle means 80 at a selected one of a plurality of vertically spaced positions whereby the logs can be stacked from bottom to top of the vehicle means in a conventional manner. As the logs are moved off the end of the second conveyor section 76 they will slide acros the vehicle trolley means 80 until they can contact the log stop and alignment means 84, as shown in FIGS. 2 and 3.

The operation of the log handling system of the first modification illustrated in FIGS. 4 and 5 will be substantially in the same manner as the operation of the first embodiment of the FIGS. 1 through 3. To begin an operation, an operator would energize conventional switch means to effect operation of the power control motor means to effect operation of the infeed means 91, 92, the log feeding means including the indexing means 22, the rotary cutting assemblies 50, the cut log conveying means 73 and the sawdust conveying means 89. After the power means has been energized to effect operation of the related components above mentioned, a log would be placed on the infeed tables 90 by a conventional fork lift truck or placed directly thereon from an off-loading truck vehicle, as above described. The log would then be conveyed by the chains 91, 92 until they are deposited on the flat table portion 96. Logs which are deposited on the flat table portion 96 would then be advanced by the reciprocally operable log indexing means 22 to move the log past the series of cutting assemblies 50 to cut a log into a series of predetermined lengths in substantially the same manner as described in regard to the first embodiment.

After a log has been cut into the predetermined lengths, it would be conveyed laterally along conveyor 73 to the vehicle trolley means 80 for arrangement thereon by the vertically adjustable conveyor section 76. The sawdust would also be conveyed by the convey 89a to a remote location as above described. It is to be understood that the modification illustrated in FIGS. 4 and 5 would operate in substantially the same manner as the original embodiment of FIGS. 1–3 with the exception that the rotary log feeding means 36 has been omitted and the reciprocally operable log indexing means 22 has been located on the structure relative to the cutting disc 58 whereby the reciprocally operable indexing means 22 would feed a log past the cutting disc to effect the cutting operations.

The operation of the second embodiment illustrated in FIGS. 6, 7, 9 and 10 would operate similarly to the two above described log handling systems insofar as the related components are concerned. However, the modification of FIGS. 6, 7, 9 and 10 includes the log segregating means 100 for allowing selected logs to be separated and conveyed laterally away from the cutting assemblies 50 for use in a saw mill operation in the manufacture of lumber. In the operation of the log segregating means 100, an operator would be stationed to inspect the logs as they are conveyed along the infeed tables 11, 12. Whenever a log was in position on the infeed table 11, 12 which was suitable for use in the manufacture of lumber, an operator would energize conventional manual control means to effect operation of the power control cylinder 116 to in turn effect a counterclockwise rotation of the arms 112, 113, about the axis of shaft 114. In this position, the extended ends of the arms 112, 113 would be elevated above the outfeed end of the indexing feed means 122, and a selected log which was being moved by the indexing feed means would drop into the transverse conveyor means 101 for conveyance laterally away from the cutting assemblies 50. After a selected log has been allowed to drop onto the transverse conveyor 101, the hydraulic control cylinder 116 would be de-energized to allow the movable ramp sections 111 to again return to the retracted ramp conveying position whereby a nonselected log would be allowed to move by gravity over the movable ramp sections onto the inclined ramp means 35.

A log that has been selected for use in the manufacture of lumber would then be conveyed by the roller means 104 laterally away from the cutting assemblies 50. Logs suitable for use in the manufacture of lumber usually include a top portion of a much less diameter which is not suitable for the manufacture of lumber. For this reason, a cut-off saw means 130 is provided for cutting the portion of a selected log therfrom which would not be suitable in the manufacture of lumber. To accomplish this, the selected log is conveyed by the conveyor means 101 to a desired position for topping the log to remove the undesirable portion therefrom. After the selected log has been moved into position for a topping operation, energization of the power control cylinder 137 will be effected to oscillate cutting disc 34 about the pivot axis 132. The oscillating movement of the cutting disc 134 will cut the selected log at a predetermined location to remove the undesirable top portion therefrom. After the undesirable top portion of the log has been severed therefrom, the log ejecting means 119 will be energized by operation of the power control cylinder 123 to eject the selected desirable portion of the log for lumber onto the ramp portion 127 for conveyance by gravity to a collecting source. The top or undesirable portion of the selected log is then conveyed into position on the second conveyor 118 and is ejected by the log ejecting means 119 through the operation of the power control cylinder 124 to eject the undesirable top portion of the log onto the ramp means 128. After the log top portion has been deposited on the ramp means 128, the ramp is detailed in design to allow the log to be conveyed by gravity onto the log handling conveyor 73 for further conveyance to the vehicle trolley means 80.

It now becomes apparent that the illustrative embodiments of the log handling system herein described are capable of obtaining the above stated objects and advantages. It is obvious that those persons, skilled in the art, may make modifications in the details of construction without departing from the spirit of the invention which is to be limited only by the scope of the appended claims.

What is claimed is:

1. In an improved log handling system for use in processing logs, the improvement comprising, in combination:
   a. a plurality of operable cutting means supported on said system at predetermined spaced locations for severing a log at a plurality of spaced points;
   b. a first log conveying means for conveying a log away from said cutting means; and
   c. log feeding means including:
      i. rotatable feed means having circumferentially spaced arms provided with log cavity portions for receiving and advancing a log past said operable cutting means whereby said log will be cut into a plurality of predetermined lengths;
      ii. ramp means adjacent said first log conveying means, said ramp means having a selectively movable portion for movement between a ramp conveying position whereby a log will be conveyed to said rotatable feed means for engagement by said log cavity portions and to a displaced position which will direct a log onto said first log conveying means; and iii. power control means connected to said selectively movable portion for moving said selectively movable portion between said ramp conveying position and said displaced position; and d. second feeding means for moving logs from a point remote from said system to a position above said ramp means.

2. In an improved log handling system as described in claim 1 further characterized in that said second feeding means includes a reciprocable advancing member supported for reciprocating movement in a direction transverse to said ramp means and said rotatable feed means and including a series of advancing lugs pivotally supported on said reciprocable member for movement between a log advancing position and an inoperative retracted position whereby said lugs will be automatically moved to said log advancing position in response to one direction of movement of said reciprocable manner and will be moved to said retracted inoperative position in response to an opposite direction of movement of said reciprocable member.

3. In an improved log handling system as described in claim 2 further characterized in that said system includes a second conveying means supported on said system below and adjacent to said cutting means and said feeding means for receiving and moving said cut logs away from said system.

4. In an improved log handling system as described in claim 3 further characterized in that said system includes a sawdust collection means operatively associated with said cutting means for collecting sawdust and wherein said sawdust collecting means includes a sawdust conveying means operatively associated therewith for conveying said collected sawdust away from said log handling system.

5. In an improved log handling system as described in claim 4 further characterized in that said first conveying means includes a log stop means operatively associated therewith for stopping a conveyed log at a predetermined location, and operable cutting means operatively associated with said first conveying means and located at a predetermined location from said log stopping means for cutting said conveyed log into a predetermined length.

6. In an improved log handling system as described in claim 5 further characterized in that said system includes a log ejecting means operatively associated with said first conveying means adjacent said stop means for ejecting a log in a transverse direction for movement away from said first conveying means.

7. In an improved log handling system as described in claim 5 further characterized in that said system includes two log ejecting means operatively associated with said first conveying means and operable for ejecting a log in a selected one of opposite transverse directions from said first conveying means.

8. In an improved log handling system as described in claim 7 further characterized in that said second conveying means includes a selectively movable end portion for movement in a vertical plane between selected vertical positions for use in conveying a log into a transport vehicle at a plurality of vertically spaced locations.

9. In an improved log handing system as described in claim 8 further characterized in that said system includes a vehicle log carrying means operatively associated with said second conveying means for receiving logs conveyed by said second conveying means and wherein a stop means is operatively associated with said vehicle means and said second conveying means for stopping a conveyed log in a proper position on said vehicle means.

10. In an improved log handling system as described in claim 1 further characterized in that said log feeding means includes a reciprocable advancing member supported on said system for reciprocating movement in a direction transverse to said plurality of cutting means and a series of advancing lugs pivotally supported on said reciprocable advancing member for movement between a log advancing position and a retracted inoperative position whereby said lugs are moved to said log advancing position in response to one direction of movement of said reciprocable advancing member and are moved to said retracted inoperative position in response to an opposite direction of movement of said reciprocable advancing member.

11. In an improved log handling system as described in claim 10 further characterized in that said system includes a second log conveying means supported on said system below and adjacent to said cutting means and said feeding means and operable for receiving said cut logs and moving said cut logs away from said system.

12. In an improved log handling system as described in claim 11 further characterized in that said system includes a collecting ramp operatively associated with said cutting means for collecting sawdust and wherein said sawdust collection ramp includes a sawdust conveying means operatively associated therewith for conveying said collected sawdust away from said log handling system.

13. In an improved log handling system as described in claim 11 further characterized in that system includes a log carrying means operatively associated with said conveying means for receiving logs conveyed by said conveying means and wherein a stop means is operatively associated with said carrying means and said conveying means for stopping a conveyed log in a proper position on said carrying means.

14. In an improved log handling system as described in claim 13 further characterized in that said conveying means includes a selectively movable end portion for movement in a vertical plane between selected vertical positions for use in conveying a log onto said carrying means at a plurality of vertically spaced locations.

* * * * *